(12) United States Patent
Huston

(10) Patent No.: US 8,207,843 B2
(45) Date of Patent: *Jun. 26, 2012

(54) GPS-BASED LOCATION AND MESSAGING SYSTEM AND METHOD

(76) Inventor: Charles D. Huston, Austin, TX (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/146,907

(22) Filed: Jun. 26, 2008

(65) Prior Publication Data

US 2008/0259096 A1 Oct. 23, 2008

Related U.S. Application Data

(63) Continuation-in-part of application No. 12/111,688, filed on Apr. 29, 2008, which is a continuation-in-part of application No. 11/875,414, filed on Oct. 19, 2007, which is a continuation-in-part of application No. 11/624,998, filed on Jan. 19, 2007, which is a continuation-in-part of application No. 11/456,715, filed on Jul. 11, 2006, now Pat. No. 7,855,638, and a continuation-in-part of application No. 11/456,723, filed on Jul. 11, 2006, now Pat. No. 7,518,501.

(60) Provisional application No. 60/699,205, filed on Jul. 14, 2005.

(51) Int. Cl.
*G08B 1/08* (2006.01)

(52) U.S. Cl. ............... 340/539.13; 455/456.1; 705/319; 345/158; 345/659

(58) Field of Classification Search ............... 455/456.1; 345/158, 659; 340/539.13; 705/319
See application file for complete search history.

(56) References Cited

U.S. PATENT DOCUMENTS

| 5,364,093 | A  | 11/1994 | Huston et al. |
| 5,802,492 | A  | 9/1998  | DeLorme et al. |
| 6,115,177 | A  | 9/2000  | Vossler |
| 6,166,679 | A  | 12/2000 | Lemelson et al. |
| 6,195,090 | B1 | 2/2001  | Riggins, III |
| 6,317,127 | B1 | 11/2001 | Daily et al. |
| 6,330,356 | B1 | 12/2001 | Sundareswaran et al. |
| 6,411,266 | B1 | 6/2002  | Maguire, Jr. |

(Continued)

FOREIGN PATENT DOCUMENTS

EP 1113669 7/2001

(Continued)

OTHER PUBLICATIONS

O'Malley et al., "Human Activity Tracking for Wide-Area Surveillance," University of Florida, Department of Electrical and Computer Engineering, May 2002, 7 pages.

(Continued)

*Primary Examiner* — Pierre-Louis Desir
(74) *Attorney, Agent, or Firm* — Charles D. Huston; Daffer McDaniel, LLP

(57) ABSTRACT

A system and method for viewing a target in a background from a user's perspective. In one form, the views are selectable by the user on, for example, a GPS equipped cell phone, to include a view from the participant's position, zoom, pan, and tilt views, or views from another geographic location, giving increased situational awareness and identification of the target. Other information can be conveyed, such as messages or advertisements, on a billboard, which may be a geo-referenced area on or near the target. Preferably, an orientation mechanism shows when the device is correctly pointed to a target.

24 Claims, 9 Drawing Sheets

U.S. PATENT DOCUMENTS

| | | | |
|---|---|---|---|
| 6,578,203 B1 | 6/2003 | Anderson, Jr. et al. | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,209,035 B2 | 4/2007 | Tabankin et al. | |
| 7,317,705 B2 | 1/2008 | Hanson | |
| 7,546,317 B1 | 6/2009 | Kaptelinin | |
| 7,593,687 B2 | 9/2009 | Anderson, Jr. et al. | |
| 7,812,766 B2 | 10/2010 | Leblanc et al. | |
| 2002/0154174 A1 | 10/2002 | Redlich et al. | |
| 2002/0188678 A1 | 12/2002 | Edecker et al. | |
| 2003/0032436 A1 | 2/2003 | Mikuni | |
| 2003/0174178 A1 | 9/2003 | Hodges | |
| 2003/0187730 A1 | 10/2003 | Natarajan et al. | |
| 2004/0036622 A1 | 2/2004 | Dukach et al. | |
| 2004/0051680 A1* | 3/2004 | Azuma et al. | 345/8 |
| 2004/0104935 A1 | 6/2004 | Williamson et al. | |
| 2005/0078195 A1 | 4/2005 | VanWagner | |
| 2005/0148388 A1 | 7/2005 | Vayra et al. | |
| 2005/0207617 A1 | 9/2005 | Sarnoff | |
| 2005/0250458 A1 | 11/2005 | Graham et al. | |
| 2005/0259002 A1 | 11/2005 | Erario et al. | |
| 2006/0104600 A1 | 5/2006 | Abrams | |
| 2006/0105857 A1 | 5/2006 | Stark | |
| 2007/0103292 A1 | 5/2007 | Burkley et al. | |
| 2007/0265089 A1 | 11/2007 | Robarts et al. | |
| 2008/0194323 A1 | 8/2008 | Merkli et al. | |

FOREIGN PATENT DOCUMENTS

| | | |
|---|---|---|
| EP | 1262213 | 12/2002 |
| KR | 10-2005-0055506 | 6/2005 |
| WO | 01/05476 | 1/2001 |
| WO | 01/36061 | 5/2001 |

OTHER PUBLICATIONS

Barstow et al., "Personalized Interactive Real-Time Sports Reporting Using Java," American Programmer, Jan. 1997, pp. 32-37.

International Search Report, PCT/US2006/027218, mailed Feb. 12, 2007.

Office Action mailed Apr. 14, 2009 for U.S. Appl. No. 11/456,715.

Final Office Action mailed Dec. 28, 2009 for U.S. Appl. No. 11/456,715.

Office Action mailed Mar. 16, 2010 for U.S. Appl. No. 11/456,715.

Notice of Allowance mailed Oct. 4, 2010 for U.S. Appl. No. 11/456,715.

Office Action mailed Apr. 17, 2008 for U.S. Appl. No. 11/456,723.

Final Office Action mailed Oct. 1, 2008 for U.S. Appl. No. 11/456,723.

Notice of Allowance mailed Dec. 15, 2008 for U.S. Appl. No. 11/456,723.

Office Action mailed Oct. 6, 2009 for U.S. Appl. No. 11/624,998.

Office Action mailed Apr. 14, 2010 for U.S. Appl. No. 11/624,998.

Office Action mailed Sep. 1, 2010 for U.S. Appl. No. 11/624,998.

Office Action mailed Feb. 15, 2011 for U.S. Appl. No. 11/624,998.

Office Action mailed Jun. 14, 2011 for U.S. Appl. No. 11/624,998.

Office Action mailed Oct. 6, 2009 for U.S. Appl. No. 11/875,414.

Final Office Action mailed Jun. 22, 2010 for U.S. Appl. No. 11/875,414.

Office Action mailed Dec. 21, 2010 for U.S. Appl. No. 11/875,414.

Final Office Action mailed Jun. 9, 2011 for U.S. Appl. No. 11/875,414.

Office Action mailed Aug. 8, 2011 for U.S. Appl. No. 12/111,688.

* cited by examiner

GPS-BASED LOCATION AND MESSAGING SYSTEM AND METHOD

PRIORITY CLAIM

This application is a continuation-in-part of the following: U.S. patent application Ser. No. 12/111,688 filed Apr. 29, 2008 which is a continuation-in-part of U.S. patent application Ser. No. 11/875,414 filed Oct. 19, 2007 which is a continuation-in-part of U.S. patent application Ser. No. 11/624, 998 filed Jan. 19, 2007 which is a continuation-in-part of U.S. patent application Ser. Nos. 11/456,715 and 11/456,723 filed Jul. 11, 2006 both of which claim priority to U.S. Provisional Application No. 60/699,205 filed Jul. 14, 2005; all of which are incorporated herein by reference, and the benefit of 35 U.S.C. §120 is claimed.

BACKGROUND

1. Field of the Invention

This invention relates generally to a GPS-based system and method that displays different views of a target and, in particular, utilizes a user's selected source position to assist in displaying information about the target.

2. Description of Related Art

GPS systems have been used as navigation systems to location destinations. GPS systems have also been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS systems are becoming much more accurate, inexpensive and robust. GPS antennas and engines are fairly inexpensive and accurate with WAAS to less than 2 meters. In navigation use, the accuracy of GPS can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54 M bit/sec. Wi-max (802.16) has network signals approaching 30 miles with data rates as high as 70 M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications). Other radio technologies are also promising in many applications, such as Zigbee and Ultrawideband.

What has not been done in sports is an integrated GPS system for spectators to more fully enjoy a sport particularly at a remote location. For example, at a NASCAR race, the TV or radio viewing location limits his view of the race and is not his own unique perspective. While watching a race, the spectator might listen to a radio or watch a portable TV, but the perspective is the announcer's or TV angle. Such divergent perspectives—announcer versus personal—can be confusing. Further, a remote spectator might be most interested in the cars he is interested in—the ones near the $3^{rd}$ turn. Other sports would benefit from a system that allows a spectator to more fully integrate the contest information with his desired viewing perspective. In addition to auto racing, football, yachting, horse racing, golf, hockey or any motor sport are candidates for the system and method hereof, especially as size and weight of GPS and radios accompanying a participant decreases.

U.S. Pat. No. 6,744,403 describes a GPS system for tracking objects, such as cars, at a sporting event. See also, U.S. Pat. No. 6,195,090; U.S. Patent Application Publication No. 2006/0105857; U.S. Patent Application Publication No. 2005/0259002. High data rate packet transmission is known, such as U.S. Pat. Nos. 6,894,994; 6,909,738; 6,885,652; 6,917,644; and 6,801,516. Examples of user interfaces, such as PDAs, cell phones, headsets, and the like are described, for example, in U.S. Pat. Nos. 7,053,780; 6,879,443; and 6,115, 177. All references cited herein are incorporated by reference.

In navigation and locator GPS-based systems, what is lacking is an integrated GPS system for an individual user to gain situational awareness and to easily identify destinations or other areas of interest. That is, while a user might possess a GPS-enabled cell phone that transmits his position and gives text based directions to a destination, this information gives a very incomplete understanding to visually identify a destination. Such a user might have an overhead view of a map showing the position of the destination on the map, but leaves it up to the user to find and identify the destination.

A particular problem in the area of personal navigation is identifying a place of interest in a confusing environment, such as a crowded street. For example, a cell phone having a GPS might be enabled to identify that a destination is near, but the user cannot locate the destination because of the clutter or environment, e.g. a crowded street or neighborhood or obstructions to the user's line of sight. Users also have difficulty relating how a small mark identifying a place on a map correlates to their position or their view of the environment.

SUMMARY OF THE INVENTION

The present invention contemplates a GPS system that provides target area information relevant to the viewer's selected perspective or location or is selectable to view the target area to another location or target. Preferably, the object is a target location, such as a destination location and the target is conveyed in the context of its background environment, such as a row of buildings on a city street. The user preferably has a portable viewing device that accepts the user's GPS derived position and selectively displays a view of the target from the user's perspective or location or selectively from another location. Preferably, the user's portable viewing device includes an orientation indicator so that the user has feedback indicating the device is pointed towards the desired target. That is, the user can selectively view and identify a target from different locations, views, and magnification and the user can tell if the viewing device is oriented correctly. Even remote users can use a device with a network information feed to identify a target. In a preferred form, a geo-referenced billboard is included on or near the target and conveys information to the user. For example, messages such as advertisements or the name of the target can be conveniently displayed on the billboard.

For example, in a NASCAR race, the cars are all equipped with a GPS engine and a communication link to a central server. Each spectator has an internet device has a communication link to the central server. The internet device logs in with the central server, optionally authenticating and telling the server the spectator's selected location and optionally a target location or orientation. During the race, the positions of the cars are broadcast to the spectator's internet device. In one mode, the internet device displays information most relevant to the spectator's selected source location. For example, the position and vital information of the cars nearest the spectator's selected location. In another mode, the internet device has the processing power to take the positions of the cars and the location of the spectator's selection and render a depiction of the cars in real time on the track. The spectator can select the view. For example, the spectator might select "finish line," "overhead," "car 3 driver's view," or "my view."

A spectator might designate the 3rd turn as "my view" selected to see the perspective of the rendering on the internet device to match a view from the 3rd turn—i.e. the source location including elevation. This adds to a much greater enjoyment of the contest because visual data is added to the display which matches the spectator's desired observation. Importantly, the spectator can not only switch views and source locations, but can also tilt or pan the perspective or observation point or zoom. That is, from "my view" the spectator might rotate a toggle up incrementally up (or down) from the horizontal view from the spectator's selected location of the car positions to a vertical view of the contest. Preferably, the toggle would also allow left/right pan at any time.

In addition to the view of the vehicles (or contestants) the spectator can selectively view appended important information. For example, in one mode the user might select no information, in a second mode, the user might select car identification only, while in another mode, the user might select identification plus speed, plus acceleration of one or more selected cars. Other information from car sensors are possible (or derived from GPS information) such as linear or radial G, engine or tire condition, fuel state, etc. Preferably, the spectator could go from a view mode to other modes, such as a display of the current information of the cars in tabular form, a view from a particular camera (streaming video), pit video or rendering, etc. Preferably, the internet device could include a radio (such as WiFi, Zigbee, Ultrawideband, or WiMax) to relay other information such as audio for monitoring car or pit communications or radio broadcasts, or even streaming video of TV broadcasts in, e.g. a separate window.

In "my view," for example, the portable device might display only information to the 3rd turn selected position for cars nearest the 3rd turn. Alternatively, the spectator might want to follow a particular car continuously, e.g. follow car number 8, with selectable views (overheard, turns, stands, head, driver's view). In any of these modes, the spectator could zoom, pan or tilt as described above, freeze, slow motion, replay, etc. In many instances, the spectator might want to view the event from a position of a participant.

While one embodiment is described in the context of a car race such as NASCAR, IRL, NHRA, CART, Formula One, it is easily seen how the system and method of the present invention is applicable to a wide variety of spectator sports. Auto, aircraft, motorcycle, bicycle, boat racing, horse racing, football, soccer and hockey are just a few examples. Even hunting or fishing tournaments or TV shows would benefit from the system and method hereof. For example, a golf spectator (on the course or at home) might use the internet device to follow a particular golfer during a round. Information on the position of the player's golf ball can be supplied from a variety of sources—currently the PGA uses triangulation to acquire the data during play and provides the golf ball position information on its web site. However, the information could easily be gathered by a portable GPS unit accompanying the golfer's caddy or other dedicated data gatherer accompanying the golfer. Once the golf ball position information of each player is gathered, the information is distributed to the spectator based on the spectator's desires. As may be surmised from the NASCAR description above, the golf spectator might select the source viewing position and the target or orientation, determine the angle or view of the graphic rendering, the tilt, pan or zoom of the graphic depiction, the format of the presentation, i.e. graphic of a hole or a tabular summary of all golfers, or one golfer, statistics for a location or hole, etc.

While one limitation to the applicability of the present invention to a spectator sport is the ability to determine the position of a participant, those limitations are becoming less meaningful as technology progresses. For example, with current technology a football player can be fitted with a GPS device and radio that weighs less than ½ pound and is accurate within 2 meters. Foreseeable technology will enable such a device weighing several ounces (mostly battery weight), accurate with WAAS to less than 1 meters and with post-processing to centimeter accuracy. Accuracy to GPS positioning in an outdoor, unobstructed, clutter-free environment will soon be better than one meter. Post-processing at the server can occur in real time (or near real time) to achieve the desired participant accuracy. While the preferred embodiment contemplates obtaining participant location information via GPS, other types of location determination sensors are possible, such as proximity sensors, radar or radio triangulation. See, e.g., U.S. Pat. No. 5,564,698 for tracking hockey pucks, other objects, or people.

While the internet device of one embodiment is a gaming device with GPS and a radio (e.g., WiFi or Zigbee) other types of personal computers, gaming, PDA, and cell phones may equally be used. Further, although one embodiment contemplates broadcasting participant location information to spectators by radio, another embodiment broadcasts information to spectators over the internet. The rendering load of the data might be distributed, i.e., some of the graphics pipeline for the rendering could be accomplished at the server before transmission; other rendering can be performed on the internet device. However, rendering technology is rapidly advancing and becoming increasingly realistic with advances in game technology and as the processing power of the internet device increases and the rendering technology develops, it is anticipated that most of the graphics rendering can be performed at the internet device.

DESCRIPTION OF PREFERRED EMBODIMENTS

Sport System

Figure 1:
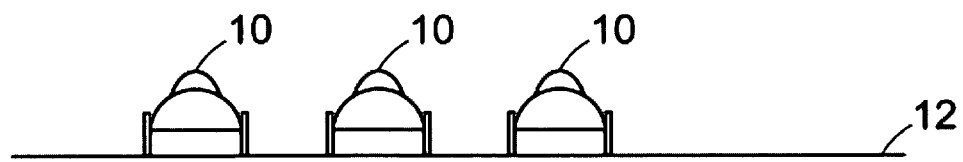
FIG. 1 is a diagram of a screen shot from the internet device showing a head on view of cars on a track.
Figure 2:
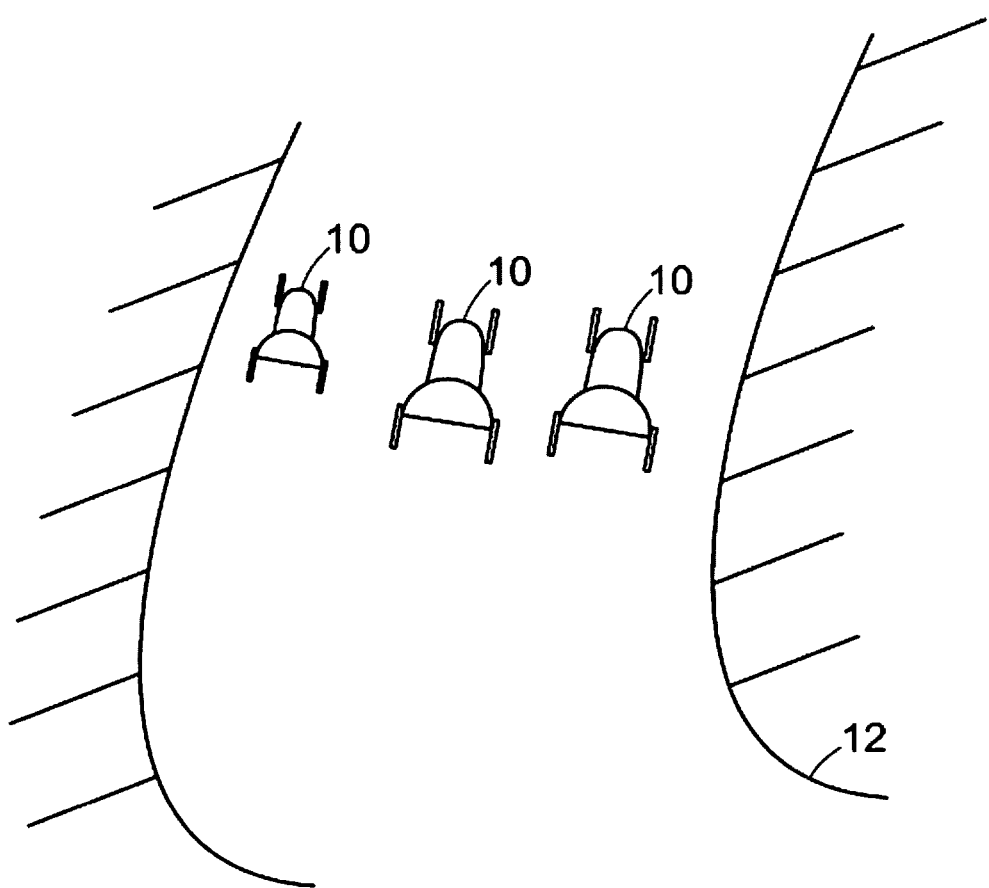
FIG. 2 is a diagram of a screen shot from the internet device showing the cars of FIG. 1 with the rendering tilted up.
Figure 3:
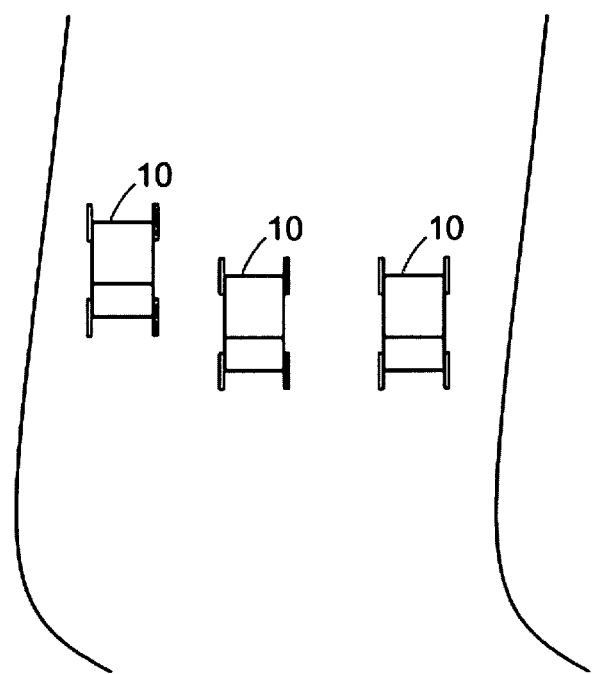
FIG. 3 is a diagram of a screen shot from the internet device showing the cars of FIG. 1 with an overhead view.

Turning to the drawings, cars 10 traverse a track 12. In FIG. 1, the spectator has selected a position at the 3rd turn of an oval track and FIG. 1 is a rendering similar to the spectator's selected view. In FIG. 2, the spectator has tilted upwardly his view so that the spectator has an oblique angle view of the cars 10 of FIG. 1. FIG. 3 is the same depiction of the cars on the track, but the view is further tilted upward to a direct, overhead view of the track 12.

Figure 4:
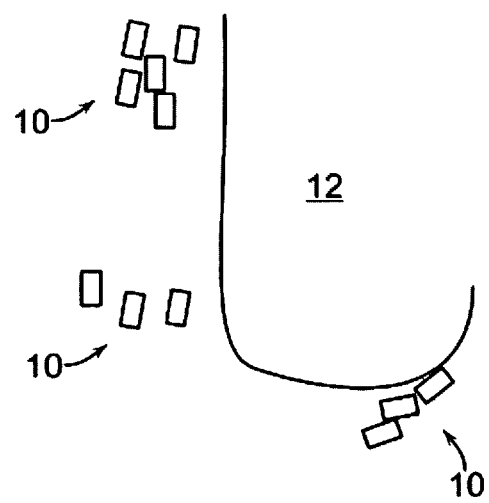
FIG. 4 is a diagram of a screen shot from the internet device showing the cars of FIG. 3 with a zoom out as compared to FIG. 3.
Figure 5:
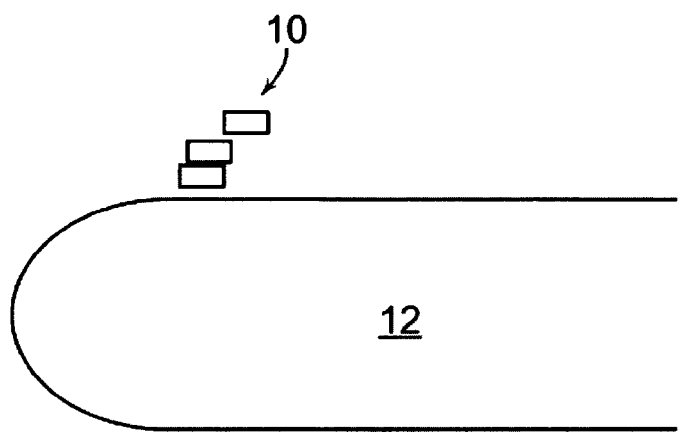
FIG. 5 is a diagram of a screen shot from the internet device showing the cars of FIG. 4 from a different angle or perspective.

FIG. 4 is of a view of the same cars 10 on the track 12 at the same moment in time as FIGS. 1-3, but the view is "zoomed" outwardly changing the scale and allowing the spectator to see more of the cars 10 on the track 12. FIG. 5 is similar in scale to FIG. 4, but the perspective has been changed to the finish line. While the display of the track 12 in FIGS. 1-4 is of an actual race, at time trials the spectator could alternatively obtain from a server a "SimulCam" using technology such as available from Dartfish where each car is superimposed at a certain time into the time trial over the position of other cars.

Of course, other data can be incorporated into the views of FIGS. 4 and 5. In particular, any geographic referenced datasets can be incorporated into a single view which includes aerial or satellite imagery, Street View imagery from Google or Street Level View from Microsoft or Telenav (3D building models), terrain elevation, mapping data or other data such as from Dartfish referenced above. The views, therefore, can be a composite of imagery, virtual (rendered), or augmented reality. The views can be 2D or 3D, and from almost any viewing angle or perspective as described herein. Therefore, in the present application, the term "background" is used to denote a realistic perspective view which can be generated as a photo image, a rendered graphic image with augmented reality, a graphic image outline, or combinations thereof. While the cars are displayed in real time (or nearly so), other data or information can be displayed in real time (or nearly so). Typically, each dataset is treated as a layer in a composition of layers, and placed in exact geographic position and scale—so-called "geographic referenced" or "geo-referenced." 3D perspectives of these combined datasets are rendered. The position of the source or starting viewpoint can be selected by the user.

Preferably, the position of the "source" can be specified, e.g. my position or participant's position (driver of car 3). Additionally, the target or direction can be specified. A particular useful sensor augmentation to the GPS information is a "direction" or orientation finder for the device 20. GPS always tells a bearing to a waypoint from a GPS determined location or source. That is, device 20 can give the user a bearing from the current user location (source) to the meeting point location or rendezvous location for one or more friendly participants. GPS information can give direction of travel when the device 20 is moving. When stopped, the orientation of the device 20 relative to the location of another participant or rendezvous location is useful information. So, in addition to the bearing to the rendezvous location the user could know if the device 20 was oriented in the correct direction—i.e. pointed to the rendezvous location or another participant or target area.

Methods are available for determining orientation of a device using GPS, but usually such GPS methods employ multiple antennas. Other means for determining direction are believed to be preferred, such as a fluxgate compass, INS, gyrocompass, digital compass, fluxgate magnetometers, or multi-axis accelerometers to name a few. Preferably, device 20 includes a direction-determining mechanism which is selectable to another location or a designated participant, and tells the user when device 20 is oriented or pointed correctly to a selected target. Alternatively, the user can select the source (e.g. current location) and the target (e.g. car #3). The user can then additionally deviate from a direct line from the source to the target by, for example, moving the elevation.

Figure 6:
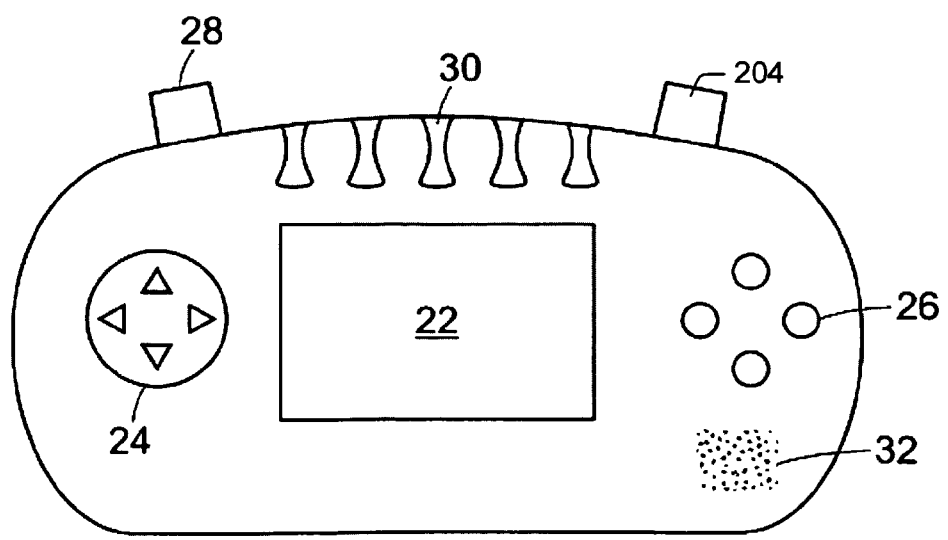
FIG. 6 is a depiction of a portable device.

FIG. 6 is a front elevation of a graphic device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 6. Not shown are the SD card slot, USB or power ports, or a camera. The Gizmondo is powered by a 400 MHz ARM9 processor and has a 2.8 inch 320×240 pixels TFT screen 22 and an NVIDIA 128 bit GeForce 3D 4500 GPU featuring a programmable pixel shader, hardware transform engine, and 1280 KB of embedded memory.

While the device 20 of FIG. 6 uses an ARM 9 processor and Sirf GPS chipset, substitutions can be readily made (e.g. uBlox GPS chipset) as well as substitutions to display 22 and memory capacity. The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 8:
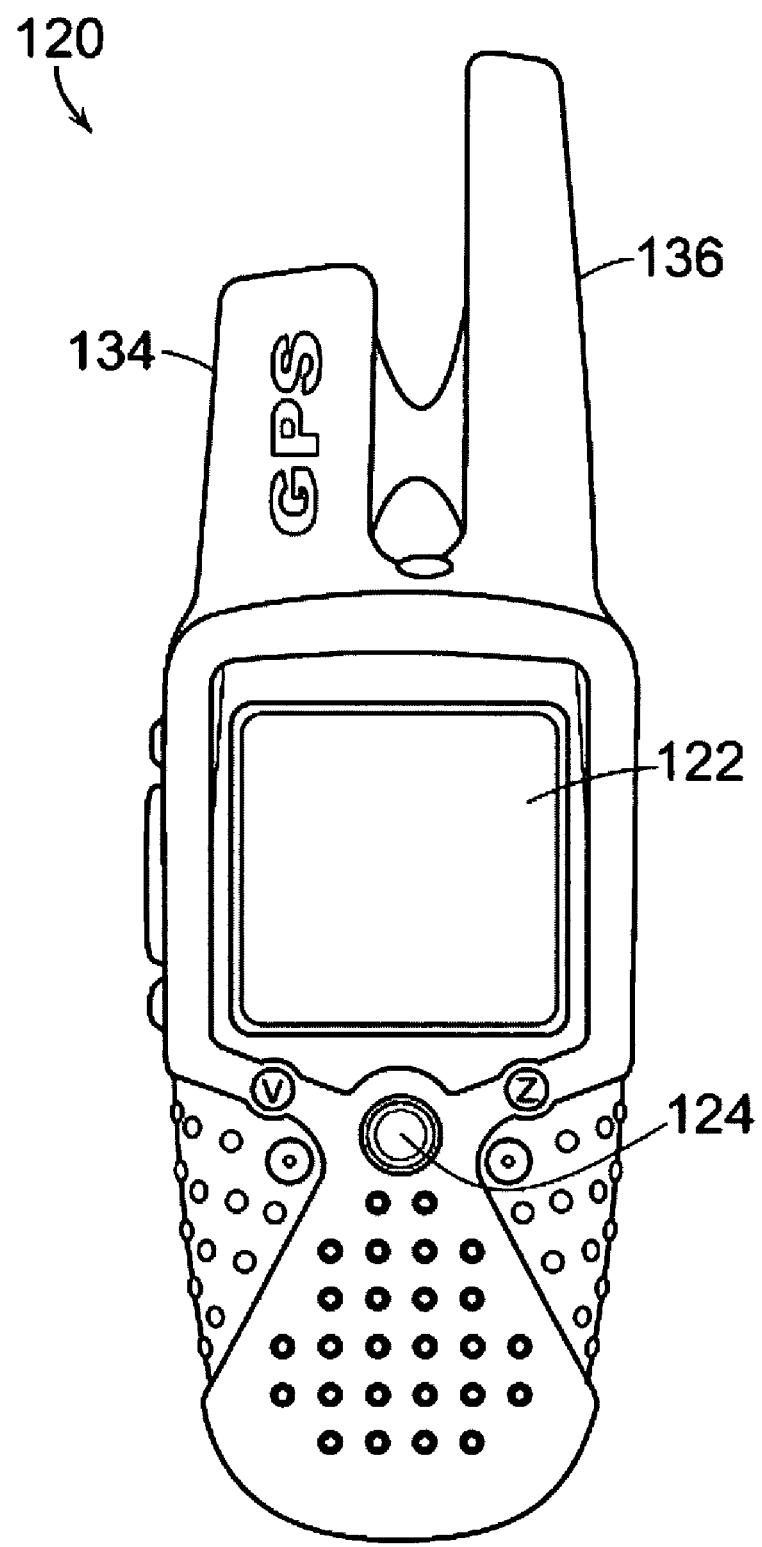
FIG. 8 is a perspective of an alternative embodiment of a portable device, resembling a PDA or a cell phone.
Figure 9:
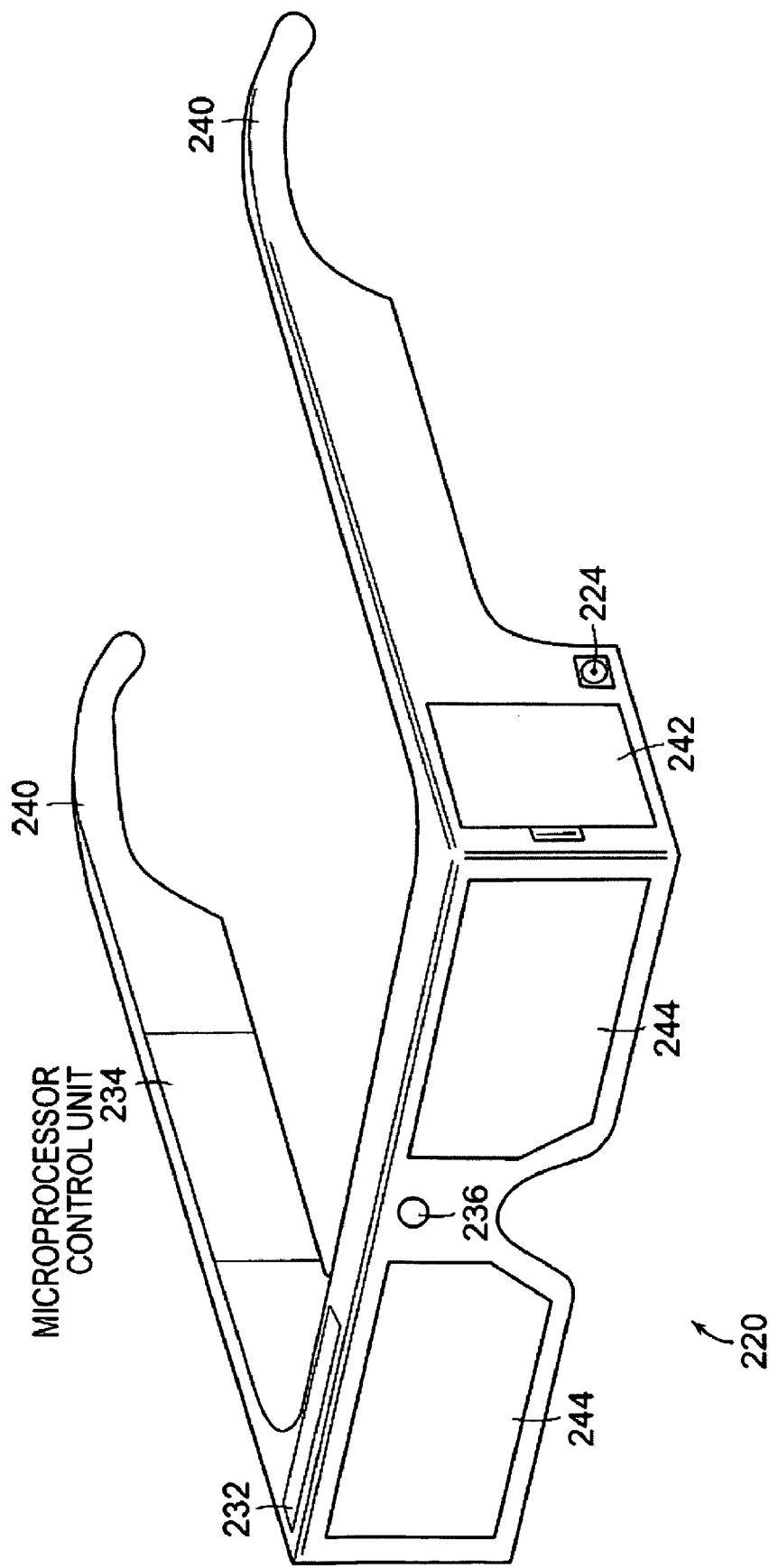
FIG. 9 is a perspective of a portable device where the functionality is built into glasses or goggles worn by the spectator.

FIGS. 8 and 9 each depict an alternative graphic device carried by the spectators. For example, the graphic device 120 of FIG. 8 includes a GPS/antenna 134, communications antenna and radio 136, a display 122, and a directional pad 124. In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

Similarly, the graphic device 220 of FIG. 9 is in the configuration of glasses or goggles and includes a GPS and patch antenna 232, microprocessor 234, radio 236. Controls, such as the directional pad 224, are on the side frames (opposite side not shown, but analogous to FIG. 6). Batteries are stored in compartment 242. The displays are transparent LCD's as at 244. Examples of such a device are the MyVue headset made by MicroOptical Corp. of Westwood, Mass. (see, U.S. Pat. No. 6,879,443). A particular benefit of the use of wearable glasses such as the embodiment of FIG. 9 is the ability to incorporate augmented reality, e.g. point of interest overlays. The yellow first down marker in football television broadcasts is an example. In this embodiment, a finish line or other point of interest overlays or markers can be highlighted, or a particular participant, or statistics on a particular participant can be viewed. In the NASCAR example, a spectator wearing the FIG. 9 glasses could see the cars, "augmented" track data (finish line) and selectively highlight a particular car and statistics for that car (e.g. fuel remaining, lap time, time back or ahead, mile per hour, miles remaining, etc.) See, e.g., U.S. Pat. Nos. 7,002,551; 6,919,867; 7,046,214; 6,945,869; 6,903,752; 6,317,127 (herein incorporated by reference).

As used herein, GPS is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the NASCAR embodiment of the preferred embodiment, two meter accuracy provided by WAAS would normally be acceptable.

Figure 7:
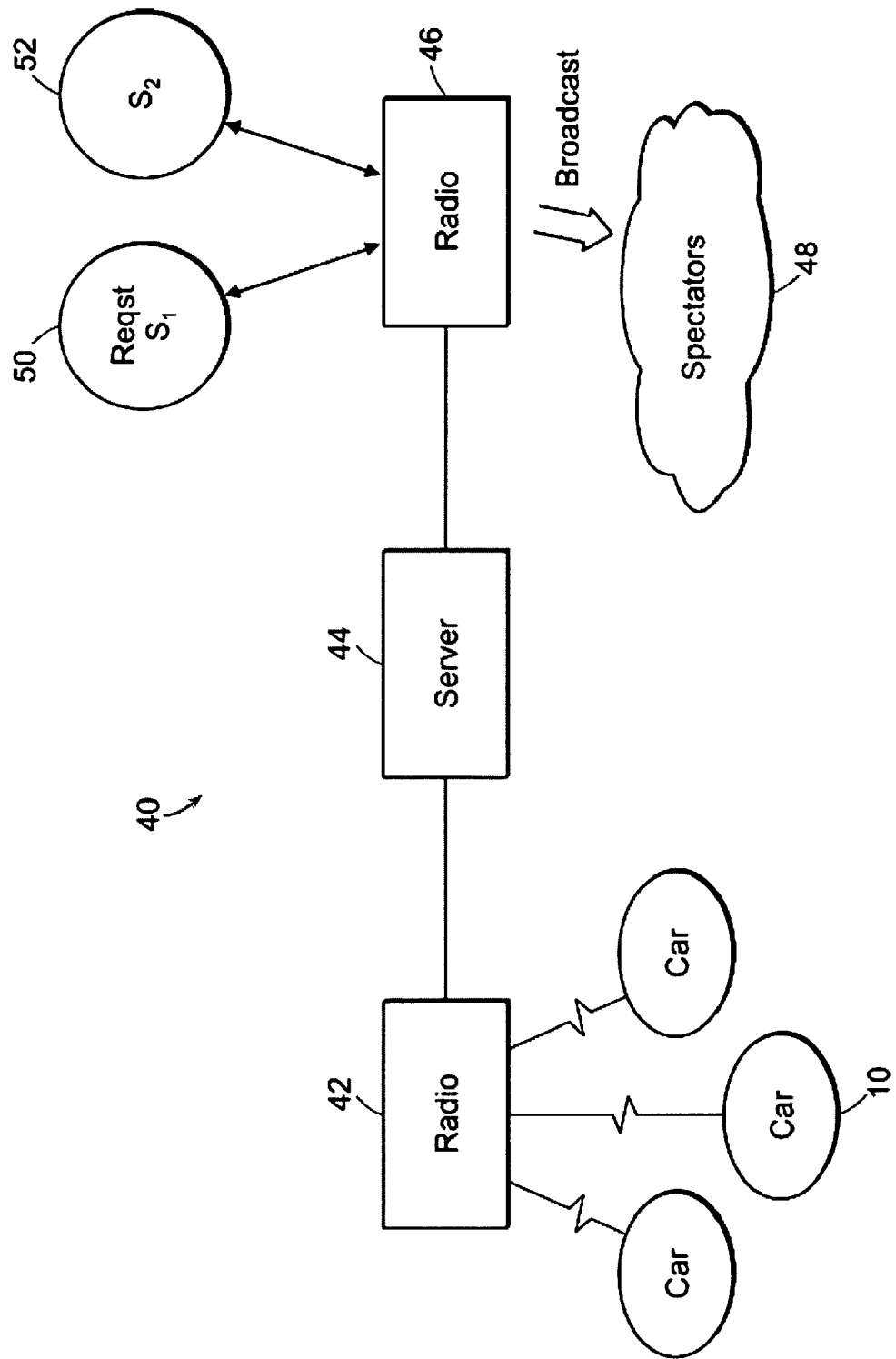
FIG. 7 is a block diagram depicting the network at a racetrack.

In FIG. 7, a depiction of the network 40 is shown. The cars 10 communicate with a radio base station 42 preferably using spread spectrum radio (encrypted or secured if desired). A spread spectrum radio such as made by Freewave Technologies of Boulder, Colo. is a preferred choice (e.g. a 900 MHz board level module). The server 44 stores the position data of each car 10 communicated to the base station 42, and other pertinent data such as car sensor data, etc. Ideally, the server 44 can also digitally store the voice communications of interest (e.g. pit to driver) and video clips of various scenes of possible interest. Of course, the server 44 can store advertising messages as well for delivery to spectators. The server 44 can also be used for authentication of graphic devices 20 and enable selectable purchases from spectators (i.e. refreshments or memorabilia for delivery). The server 44 can also process the incoming position data to increase the accuracy if desired. For example, the server 44 can include its own base station GPS and apply a correction to a participant's position if desired. In some sports, the participants might broadcast location information directly to spectators, i.e. without an intervening server. The radio 46 is used to communicate on a broadcast basis to all spectators 48—here using a GSM tri-band, the GPS position information of the cars 10 (encrypted or secured if desired). The devices 20 in the hands of the spectators 48 processes the position information to render the views illustrated for example in FIGS. 1-5.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast.

Graphics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:
    OpenGL and the OpenGL Shading Language
    OpenGL ES 3D API for embedded devices
    Direct3D (a subset of DirectX)
    RenderMan
    RenderWare
    Glide API
    TruDimension LC Glasses and 3D monitor API
There are also higher-level 3D scene-graph APIs which provide additional functionality on top of the lower-level rendering API. Such libraries under active development include:
    QSDK
    Quesa
    Java 3D
    JSR 184 (M3G)
    NVidia Scene Graph
    OpenSceneGraph
    OpenSG
    OGRE
    Irrlicht
    Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, will be added to the device 20.

While full 3D rendering is not possible with the device 20 described herein, advances in processing and rendering capability will enable greater use of 3D graphics in the future. In a particular application, such as NASCAR, a car object and a track object (e.g., Taladega) can be rendered in advance and stored, making realistic 3D graphics possible. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from spectators 48 can be made to the server 44, such as for streaming video of a particular scene or audio of a particular car 10, refreshment orders, memorabilia purchases, etc. This function is shown at 50, 52 in FIG. 7.

While one embodiment has been described in the context of a spectator in physical attendance at a sporting event with information broadcast by radio, the use of the graphic devices 20 at remote locations is equally feasible. In another embodiment more suited for remote locations, for example, the portable device 20 can be used at home while watching a sporting event on TV, with the participant location and other information streaming over the internet. WiFi in the home is a preferred mode of broadcasting the information between the portable device and the network.

Using graphic device 20 at home while watching the same sporting event on TV is believed to be a preferred embodiment for use at remote locations. However, other examples of remote location of a sporting event viewing might not be accompanied by watching TV. That is, the views of FIGS. 1-5 can be accomplished using any graphic device, including a personal computer or a cell phone. Similar to using the graphic device 20 coupled to the internet, a personal computer user can select the source or position of origination of the desired view, and the target or orientation from the source or target. Elevations, zoom, pan, tilt, etc. may be selected by the remote user as described above.

In "my view," for example, the remote location graphic device might display only information to the 3rd turn spectator for cars nearest the 3rd turn. Alternatively, the remote location spectator might want to follow a particular car continuously, e.g. follow car number 8 (or particular golfer, etc.), with selectable views (overheard, turns, stands, head, driver's view). In any of these modes, the remote location spectator could zoom, pan or tilt as described above, freeze, slow motion, replay, etc. to obtain a selected view on the graphic device.

Locator and Messaging System

Figure 10:
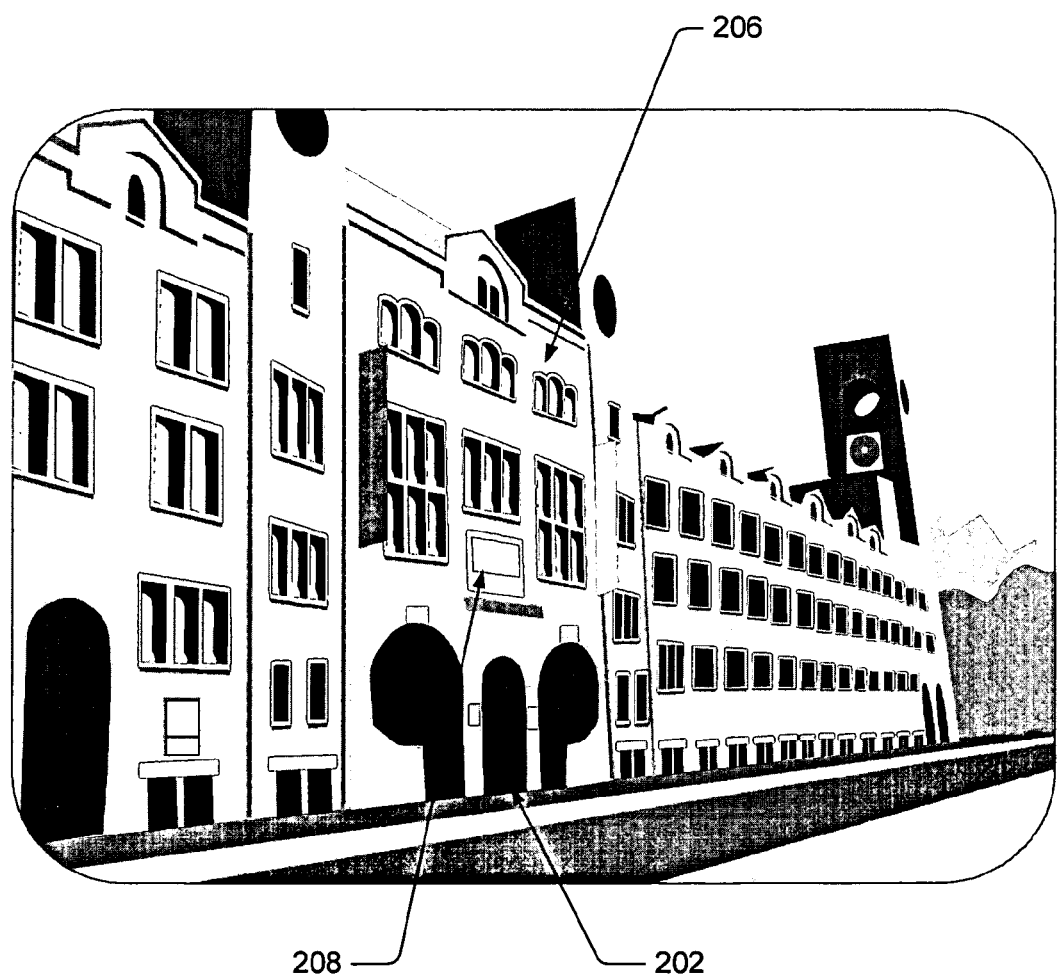
FIG. 10 is a perspective view of a target area along a street.
Figure 11:
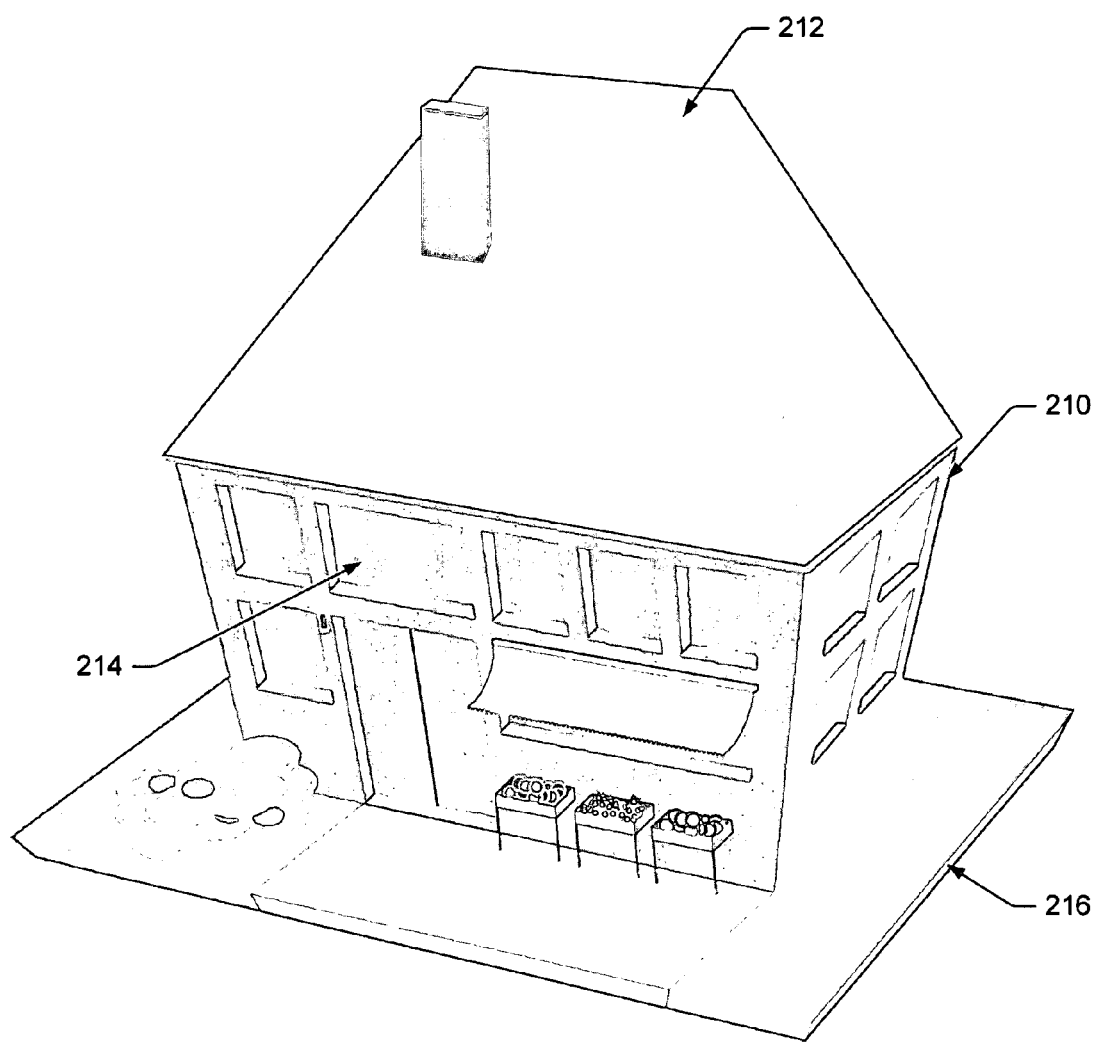
FIG. 11 is a perspective view of a target area comprising a building.
Figure 12:
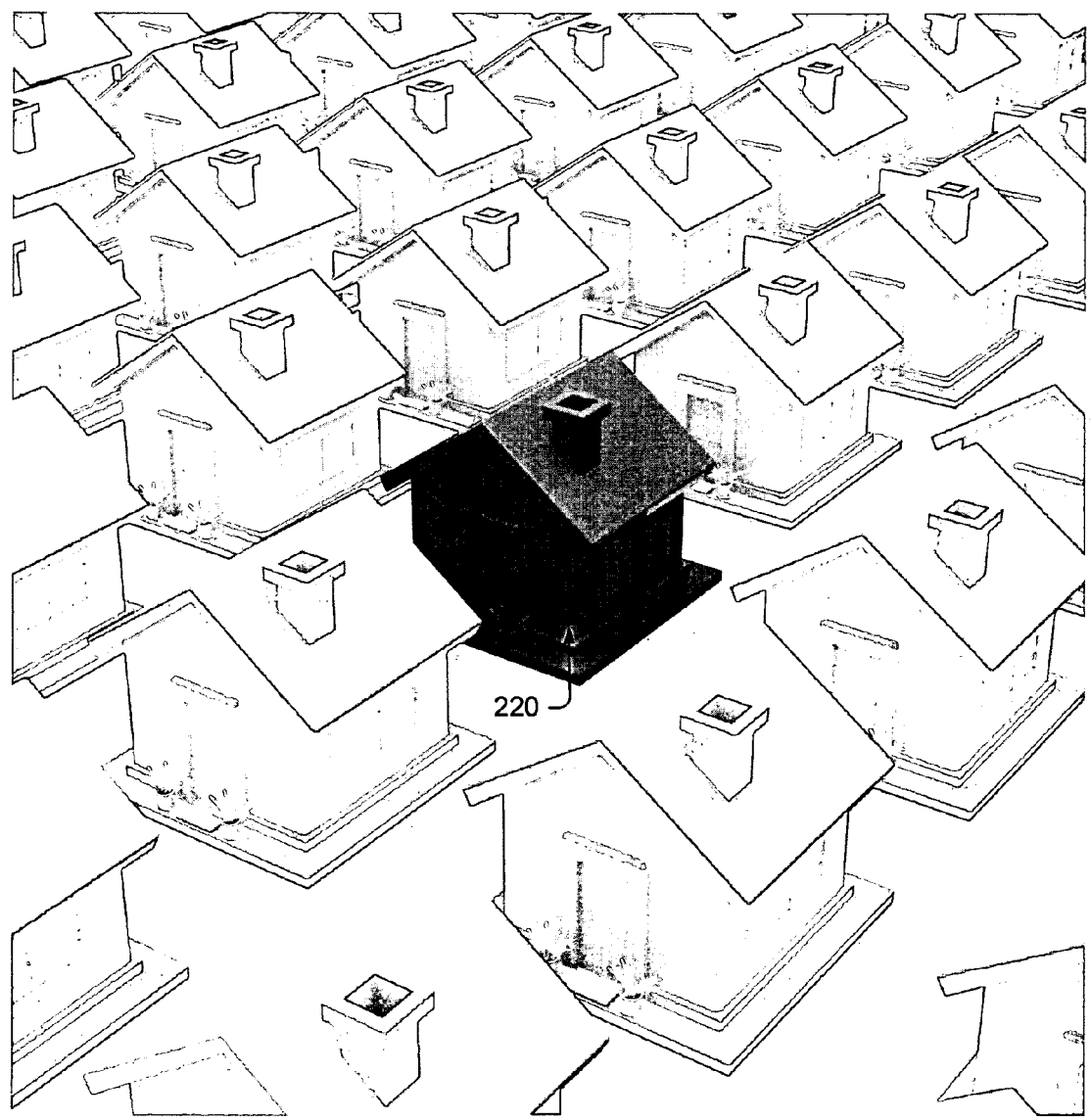
FIG. 12 is a perspective view of a target area comprising a house in a neighborhood.

Another preferred embodiment is a GPS-enabled system and method for locating people, places or things. Such a system is illustrated generally in FIGS. 10-12. FIGS. 10-12 are intended to show a "background" depiction of a target area or location from a designated perspective view. For example, in "my view" FIG. 10 shows a view from a user's location to the target area. In one embodiment, the background of FIG. 10 is as seen by the user and also displayed on device 20. As noted above, the user of device 20 can select the position of the "source" for the view and can move the source. Further, the user can zoom, pan, tilt, go to an overhead view, or utilize the other options available on device 20 as described above.

In a basic example, the user is trying to find a restaurant 202. The geographic location of restaurant 202 is retrieved by a radio link as described above, or from a database in device 20. FIG. 10 is geo-referenced to the designated "source" which, in this example, is the location of the user. Advantageously, device 20 tells the user when device 20 is oriented in the correct direction to restaurant 202 (target). See, e.g., light 204 in FIG. 6. While FIG. 6 depicts a light that illuminates when device 20 is correctly oriented (e.g. +/−10') from the source to the target, other examples will be readily appreciated. For example, a light on screen 22 can be depicted or a direction heading can be depicted (e.g. 250'). Further, restaurant 202 itself can be outlined or marked with a designation on screen 22.

While the basic example assumes the user has selected the user's location as the source location to find restaurant 202 from a street level view, the user can shift the source location as described herein. Further, the user can preview the perspective view remotely, e.g., over the internet, to understand how the target will appear, for example when transiting from the subway exit.

Because of the advances described above in connection with geo-referencing, street view and the accuracy of maps and other GIS systems, the location of building 206 housing, and restaurant 202 in FIG. 10 can be very precise, as well as the details of building 206. In particular, the location of billboard area 208 on the face of building 206 can be precise and geo-referenced.

Billboard 208 has a variety of optional uses. In one example, rather than designating target restaurant 202 with an outline or arrow, billboard 208 can contain the name of restaurant 202. Alternatively, billboard 208 can be used for conveying a message to the user. A typical message would be a relevant advertisement. For example, the user has already designated restaurant 202 as the target location; therefore, an advertisement for a dinner special or a particular drink would be relevant.

Of course, other messages can be conveyed using more conventional designations such as sidebar advertisements, pop-up balloons with advertisements or messages, click info, banner ads, etc. However, billboard 208 area may be convenient as an area that does not interfere with other features of the target. Other examples of billboard 208 can be large windows, open facades, real or artificial signs, doorways, or the like. Because the billboard is geo-referenced and the information is in the digital domain, the message on the billboard stays in the same location on the building as the user's view changes.

As described above, device 20 used in the locator and messaging system embodiment hereof does not need to be in wireless communication. However, it is believed preferable to utilize wireless communication so that different targets can be designated and downloaded, rendering can be shared with a central server, and location of the user can be shared. In particular, sharing the user's location (as designated by the user) with friends, people or establishments has certain advantages. For example, friends waiting within restaurant 202 can be alerted when the user is within a designated range or rendezvous time. Further, restaurant 202 can be alerted that a dinner reservation is on the street entering the restaurant.

FIGS. 11 and 12 are further examples of the locator and messaging system of the present invention. In FIG. 11, the target is a grocery 210 and the user, instead of selecting his own location as the source, has selected an elevated location, zoomed in, as the source. Billboard areas 212, 214, and 216 are depicted for messages, e.g. advertising, as described herein.

FIG. 12 shows a target of a house in a neighborhood 220. In FIG. 12, the house target is shown in a different color or highlight on the screen of device 22. Further, billboard area 222 conveys the message of the target destination—"Joe and Alice House"—and illustrates a billboard detached from the location of target 220.

What is claimed:

1. A method for observing a target in a background environment comprising:
    equipping a mobile user with a device having a graphics display and a GPS receiver for determining the position of the device, whereby the user can select the determined position as a source viewpoint position;
    selecting a target for viewing on the device;
    communicating target position and target information to the user's device; and
    displaying in a perspective view on the graphics display of the user's device a depiction of the target in the background environment; and
    said view being generally in the direction from the source viewpoint position to the target position wherein the target is identified on the graphics display, and at least some of said target information is displayed, wherein said user can select the source viewpoint from which to view the target position, including changing the source viewpoint from said determined position of said device.

2. The method of claim 1, wherein said device includes a digital compass for determining the orientation of the device, and said display is oriented in the approximate direction of the target.

3. The method of claim 1, including displaying said background environment as a video image and the target identification comprising augmented reality on the graphics display.

4. The method of claim 1, wherein said target information comprises a geo-referenced billboard designated on or near the target and displayed on the graphics display to convey said target information to the user.

5. The method of claim 1, wherein said user position is transmitted to a server, wherein said user's device authenticates with said server, and wherein said server communicates target position and information to the user's authenticated device.

6. The method of claim 1, wherein said the depiction of the target and the background environment comprises an artificial reality, perspective view.

7. A system for identifying a target in a background by a mobile user comprising:
    a server having a radio for transmitting information about said target; and
    a portable device adapted to accompany said user, the portable device including an interface for inputting a designation of a target, a radio for receiving said target information from said server, a GPS receiver for determining the position of the portable device and a graphics display selectable by the user to display multiple views of the background; and
    where one view is a depiction of said target relative to the background in a perspective view from said mobile user's current position as determined by said portable device GPS receiver to said target position, and another view is from a source viewpoint different from said mobile user's current position as determined by said portable GPS receiver, with said target identified using augmented reality and at least some of said information about said target is displayed.

8. The system of claim 7, including a direction indicator for indicating when the portable device is oriented approximately to the bearing from the position of the portable device to the position of the target.

9. The system of claim 7, wherein said user portable device comprises a cell phone which includes a GPS receiver for determining a cell phone position and publishes said position and identity to a cellular network.

10. The system of claim 7, wherein said one view includes a billboard conveying a message geo-referenced proximate to the target.

11. The system of claim 7, wherein said perspective view from the user's position is adjustable by the user to zoom in or out.

12. The system of claim 8, wherein the direction indicator includes an orientation mechanism.

13. The system of claim 12, wherein the orientation mechanism is a compass.

14. The system of claim 7, wherein said information about said target is a message and said one view includes a message relevant to the target.

15. The system of claim 7, including a plurality of views wherein said another view of said user's different views is a plan overhead view.

16. A method of viewing a target in an environment background by a mobile user comprising:
    determining a source viewpoint position of the mobile user using a device having a GPS receiver accompanying the user;
    wirelessly receiving information relevant to said target in said environment;
    displaying on said device a perspective view of said target in said environment background with said target identified using augmented reality, wherein the perspective view is generally from said source viewpoint position to the target location, and said user can select another view of said target from a different source viewpoint;
    displaying at least some of said target information; and
    selectively changing the view point of said perspective view from the source viewpoint position to another position, wherein changing the perspective view changes the displayed target orientation.

17. The method of claim 16, including displaying the orientation of the device relative to the selected position.

18. The method of claim 16, wherein said target information comprises an advertisement.

19. The method of claim 16, displaying on said perspective view a billboard containing a message geo-referenced proximate to the target.

20. The system of claim 7, wherein said background includes artificial reality rendering.

21. The system of claim 7, wherein said background is a video image, and said target identification comprises augmented reality.

22. The system of claim 21, wherein said device has a camera, and said video image is taken by said camera.

23. The system of claim 21, wherein said video image is a photograph stored in memory in the device.

24. The system of claim 23, wherein said photograph is a street level view downloaded from said server and stored in memory.

* * * * *